US011050350B1

(12) United States Patent
Choi et al.

(10) Patent No.: US 11,050,350 B1
(45) Date of Patent: Jun. 29, 2021

(54) CONTROLLING AN ACTIVE CLAMP SWITCHING POWER CONVERTER CIRCUIT BASED ON A SENSED VOLTAGE DROP ON AN AUXILIARY WINDING

(71) Applicant: Huayuan Semiconductor (Shenzhen) Limited Company, Shenzhen (CN)

(72) Inventors: Jinho Choi, Saratoga, CA (US); Richard M. Myers, Grass Valley, CA (US); Liang Yan, Fremont, CA (US); Wanfeng Zhang, Palo Alto, CA (US); Junjie Zheng, Cupertino, CA (US)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 0 days.

(21) Appl. No.: 16/826,132

(22) Filed: Mar. 20, 2020

(51) Int. Cl.
*H02M 3/335* (2006.01)
*H02M 1/08* (2006.01)
*H02M 1/00* (2006.01)
*H02M 1/34* (2007.01)

(52) U.S. Cl.
CPC ....... *H02M 3/33507* (2013.01); *H02M 1/083* (2013.01); *H02M 3/33576* (2013.01); *H02M 2001/0048* (2013.01); *H02M 2001/342* (2013.01)

(58) Field of Classification Search
CPC ......... H02M 3/33507; H02M 3/33523; H02M 2001/0048; H02M 2001/342
See application file for complete search history.

(56) References Cited

U.S. PATENT DOCUMENTS

| | | | |
|---|---|---|---|
| 10,103,616 B1* | 10/2018 | Lin | H02M 1/083 |
| 2010/0067259 A1* | 3/2010 | Liu | H02M 3/33569 363/21.01 |
| 2014/0185333 A1* | 7/2014 | Yang | H02M 3/33569 363/21.12 |
| 2015/0131341 A1* | 5/2015 | Koo | H02M 3/33569 363/21.13 |
| 2017/0005585 A1* | 1/2017 | Shimura | H02M 3/33569 |
| 2017/0033698 A1* | 2/2017 | Vemuri | H02M 3/33523 |
| 2017/0176919 A1* | 6/2017 | Asano | G03G 15/5004 |
| 2017/0264206 A1* | 9/2017 | Rana | H02M 1/083 |
| 2018/0062529 A1* | 3/2018 | Song | H02M 3/33507 |
| 2018/0069480 A1* | 3/2018 | Koo | H02M 1/08 |
| 2018/0131286 A1* | 5/2018 | Song | H02M 3/33592 |
| 2018/0287481 A1* | 10/2018 | Liu | H02M 3/156 |
| 2018/0294734 A1* | 10/2018 | Song | H02M 1/083 |
| 2018/0294735 A1* | 10/2018 | Song | H02M 1/083 |
| 2018/0301975 A1* | 10/2018 | Lin | H02M 1/083 |
| 2019/0058387 A1* | 2/2019 | Shimura | H02M 1/08 |
| 2019/0140550 A1* | 5/2019 | Song | H02M 3/33507 |

(Continued)

*Primary Examiner* — Yusef A Ahmed
(74) *Attorney, Agent, or Firm* — Fenwick & West LLP (57) ABSTRACT

An active clamp switching power converter circuit includes a sensing circuit that generates a sensed auxiliary winding voltage of an auxiliary winding around the core. A primary side controller controls switching of a power switch coupled to a primary winding to control current through the primary winding and controls switching of the active clamp switch based on the sensed voltage to control leakage energy when the power switch is turned off. The primary side controller regulates timing of the switching to achieve a zero voltage switching condition prior to turning on the power switch for power efficient operation.

17 Claims, 6 Drawing Sheets

(56) References Cited

U.S. PATENT DOCUMENTS

| | | | |
|---|---|---|---|
| 2019/0222131 A1* | 7/2019 | King | H02M 3/33592 |
| 2020/0014303 A1* | 1/2020 | Song | H02M 3/33569 |
| 2020/0091826 A1* | 3/2020 | Yang | H02M 3/33523 |
| 2020/0106368 A1* | 4/2020 | Chen | H02M 3/33576 |
| 2020/0395863 A1* | 12/2020 | Song | G01R 19/16538 |
| 2021/0021199 A1* | 1/2021 | Liu | H02M 3/33523 |

* cited by examiner

CONTROLLING AN ACTIVE CLAMP SWITCHING POWER CONVERTER CIRCUIT BASED ON A SENSED VOLTAGE DROP ON AN AUXILIARY WINDING

BACKGROUND

The present disclosure relates generally to a switching power converter circuit, and more specifically, to an active clamp switching power converter that uses sensing of an auxiliary winding.

An active clamp switching power converter circuit regulates power delivered to a load by controlling switching of a power switch and reduces power loss by controlling switching of an active clamp switch. However, a challenge exists in controlling timing of the switching for power efficient operation in a manner that does not depend on complex external circuits or high voltage components.

SUMMARY

A switching power converter circuit comprises a transformer coupled between an input terminal receiving an input voltage and an output terminal supplying an output voltage. The transformer includes a core, a primary winding around the core coupled to the input terminal, and a secondary winding around the core coupled to the output terminal. The switching power converter circuit further comprises a sensing circuit comprising an auxiliary winding around the core of the transformer. The sensing circuit generates a sensed voltage based on an auxiliary winding voltage across the auxiliary winding. The switching power converter circuit also comprises a power switch coupled to the primary winding of the transformer that controls current through the primary winding. The switching power converter circuit further comprises an active clamp switch to control leakage energy of the switching power converter when the power switch is turned off. The switching power converter circuit further comprises a secondary side switch to control secondary side current through the secondary winding. A secondary side controller controls switching of the secondary side switch. A primary side controller controls switching of the power switch to regulate the output voltage and controls switching of the active clamp switch to turn on the active clamp switch following the power switch turning off and to turn off the active clamp switch based on detected timing of a voltage drop occurring in the sensed voltage satisfying a predefined detection condition.

In another embodiment, a method is provided for controlling the switching power converter. In a first switching cycle, a primary side controller detects a sensed voltage value that is based on an auxiliary winding voltage across an auxiliary winding of a transformer. In the first switching cycle, the controller detects a time interval between the active clamp switch being turned on and the voltage drop in the sensed voltage satisfying a predefined detection condition. In a subsequent switching cycle, the controller controls a turn-off time of the active clamp switch relative to the turn-on time of the active clamp switch such that timing of the voltage drop in the sensed voltage satisfying the predefined detection condition in the subsequent switching cycle is closer to a target timing. The power switch is turned on a substantially fixed time period after the active clamp switch is turned off.

BRIEF DESCRIPTION OF DRAWINGS

The teachings of the embodiments of the present invention can be readily understood by considering the following detailed description in conjunction with the accompanying drawings.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF EMBODIMENTS

The Figures (FIG.) and the following description relate to the preferred embodiments of the present invention by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the disclosure described herein.

Figure 1:
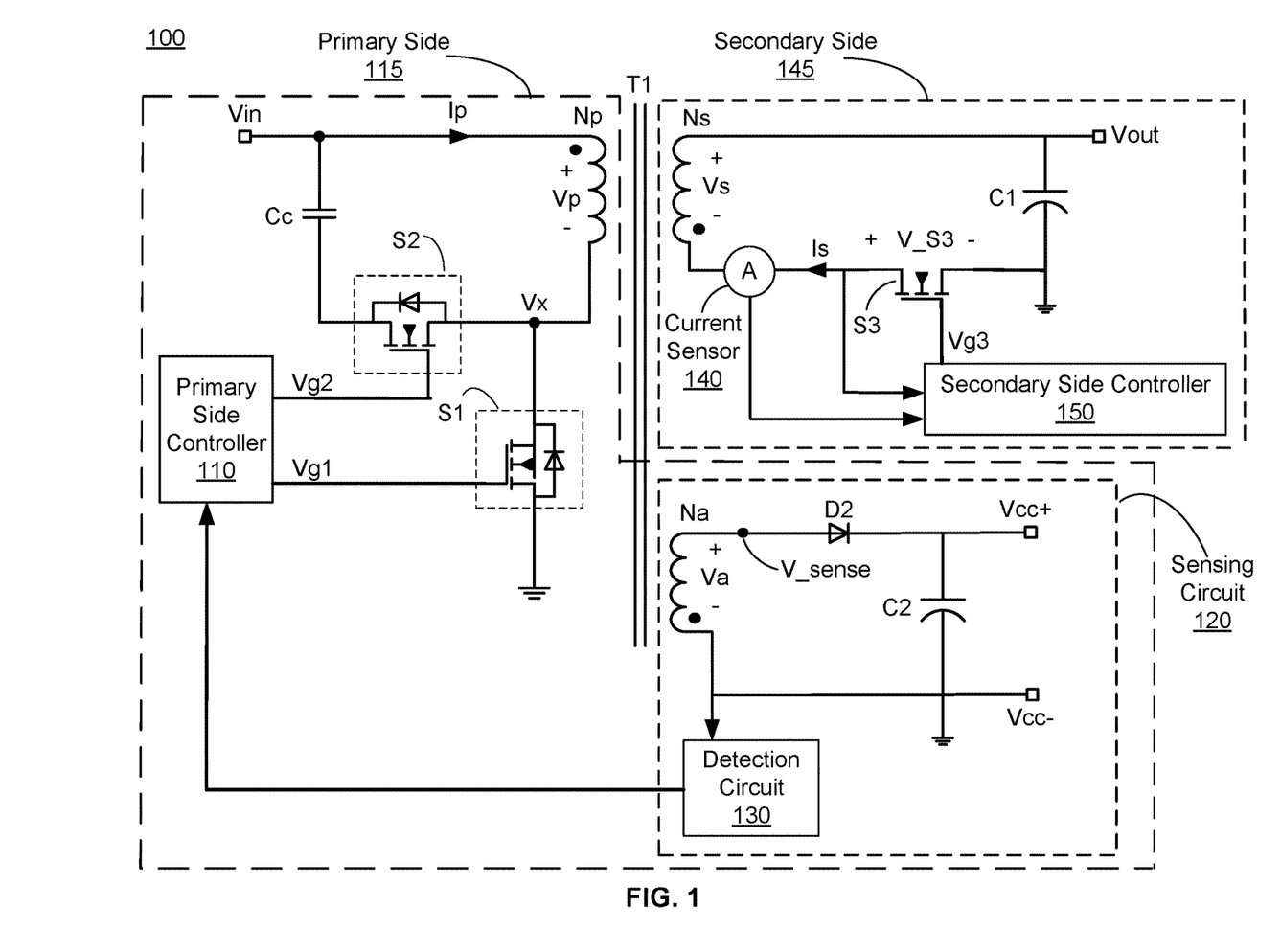
FIG. 1 illustrates a switching power converter circuit, according to one embodiment.

Figure (FIG. 1 illustrates a switching power converter circuit 100 in accordance with one embodiment. The switching power converter circuit 100 generates a regulated output voltage Vout to power a load (e.g., an electronic device (not shown)). In an embodiment, the switching power converter circuit 100 includes an active clamp flyback circuit in which leakage energy is recycled to reduce power loss relative to a conventional flyback circuit. The switching power converter circuit 100 may furthermore generate feedback signals for controlling timing of switching for efficient power operation of the switching power converter circuit 100 and to ensure switching occurs shortly after a zero voltage switching (ZVS) condition is achieved.

In an embodiment, the switching power converter circuit 100 includes a transformer T1, a power switch S1, an active clamp switch S2, a clamping capacitor Cc, a sensing circuit 120, a primary side controller 110, an output filter capacitor C1, a current sensor 140, a secondary side switch S3, and a secondary side controller 150.

The transformer T1 is coupled between an input terminal receiving an input voltage Vin (e.g., a rectified AC voltage) and an output terminal supplying the output voltage Vout to the load. The transformer T1 includes a magnetic core. On a primary side 115 of the switching power converter circuit 100, a primary winding Np has a first polarity and wraps around the core of the transformer T1 in a first direction. The primary winding Np is coupled to the input terminal at a first end of the primary winding Np. On a secondary side 145 of the switching power converter circuit 100, a secondary winding Ns has a second polarity (different than the first polarity) and wraps around the core of the transformer T1 in a second direction (different than the first direction). The secondary winding Ns is coupled to the output terminal.

The power switch S1 is coupled to the primary winding Np of the transformer T1 at a second end of the winding Np such that a voltage Vx is across the power switch S1. The power switch S1 may be a transistor such as a MOSFET, a bipolar junction transistor, or some other type of switch. The power switch S1 is configured to control the primary current Ip through the primary winding Np by enabling the primary current Ip to flow from the input voltage Vin through the primary winding Np to ground when the power switch S1 is on, and by preventing the primary current Ip from flowing to ground when the power switch S1 is off.

When the power switch S1 is off, some energy stored in the leakage inductance of the transformer causes energy loss. The active clamp switch S2 controls the flow of this leakage energy when the power switch S1 is turned off to recycle leakage energy back to the primary winding Np and reduce power loss. The active clamp switch S2 couples between the second end of the primary winding Np (at voltage node Vx) and the input voltage Vin through the clamping capacitor Cc. The active clamp switch S2 may be a transistor such as a MOSFET, a bipolar junction transistor, or some other type of switch.

The secondary side controller 150 controls switching of the secondary side switch S3. Particularly, the secondary side controller 150 controls switching of the secondary side switch S3 so that the secondary side switch S3 turns on after a voltage V_S3 across the secondary side switch begins to decrease below zero. The secondary side controller 150 turns off the secondary side switch S3 when a secondary side current Is decreases to zero (or is within a predefined range of zero). The secondary side controller 150 detects the voltage V_S3 and detects the secondary side current Is via the current sensor 140. In one embodiment, the current sensor 140 sends a signal to the secondary side controller 150 when the secondary side current Is is within a predefined range of zero.

The sensing circuit 120 includes an auxiliary winding Na that wraps around the core of the transformer T1, a control supply capacitor C2, a clamping diode D2, and a detection circuit 130. The auxiliary winding Na is wrapped around the core of the transformer T1 in a same direction and has the same polarity as the secondary winding Ns. The sensing circuit 120 is connected to a collector supply voltage Vcc at a collector supply terminal with a positive terminal Vcc+ and a negative terminal Vcc−. The clamping diode D2 is coupled between the positive terminal Vcc+ of the supply terminal between and one end of the auxiliary winding Na to clamp the sensed voltage V_sense to the negative terminal Vcc− voltage when the change in current through the auxiliary winding is sufficiently high for the clamping diode D2 to become forward biased. The sensed voltage V_sense represents the voltage across the auxiliary winding Na. The sensed voltage V_sense is monitored by the detection circuit 130. In one embodiment, the detection circuit 130 may include a high pass filter. The detection circuit 130 monitors the sensed voltage V_sense and provides a detection signal to the primary side controller 110 when the sensed voltage V_sense satisfies a predefined detection condition indicative of the secondary side switch S3 turning off. For example, the predefined detection condition may be satisfied when the sensed voltage V_sense experiences a voltage drop of at least a predefined amount over a predefined time interval during a period when the power switch S1 is turned off and the active clamp switch S2 is turned on. The predefined amount of voltage drop may be dependent on the circuit design characteristics. For instance, an amount of leakage inductance and magnetizing inductance found on the primary side 115 may affect the amount of the voltage drop. In some embodiments, the predefined amount of voltage drop may be between 3 and 4 volts. In some embodiments, the predefined time interval over which the voltage drop takes place may be between 100 nanoseconds (ns) to 400 ns. The predefined detection condition occurs and the secondary side switch S3 turns off a substantially fixed time period before the ZVS condition occurs. Thus, by detecting this voltage drop at the primary side controller, a timing of the ZVS condition can be predicted and switching of power switch S1 and active clamp switch S2 may be controlled accordingly.

The primary side controller 110 controls switching of the power switch S1 and controls switching of the active clamp switch S2. Particularly, the primary side controller 110 controls switching of the power switch S1 so that the power switch S1 has on-times and off-times appropriate to maintain a regulated output voltage Vout. Furthermore, the primary side controller 110 controls switching of the active clamp switch S2 so that it has an on-time during the off-time of the power switch S1 (i.e., so that the on-times of the power switch S1 and the active clamp switch S2 are non-overlapping), to enable recycling of the leakage energy when the power switch S1 is turned off. The primary side controller 110 furthermore controls the relative timings of the on-times and off-times of the active clamp switch S2 and the power switch S1 to enable the power switch S1 to turn on in each switching cycle a short time after a ZVS condition is achieved (i.e., the voltage Vx=0), which enables power efficient switching. The primary side controller 110 achieves these switching conditions by receiving the detection signals from the detection circuit 130 indicative of the ZVS condition and controlling switching accordingly as described in further detail below with reference to FIG. 3.

FIGS. 2A-2D illustrate a model of a primary side 115 of a switching power converter circuit (e.g., the switching power converter circuit 100) during different stages of a switching cycle with leakage inductance, magnetizing inductance, and parasitic capacitance modeled as circuit elements, according to one embodiment. In the models 200, 202, 204, 206 the leakage inductance of the primary winding Np is modeled as an inductor Lr, the magnetizing inductance is modeled as an inductor Lm, a drain-source parasitic capacitance of the power switch S1 is modeled as a capacitor Coss1, a body diode of the power switch S1 is modeled as BD1, a drain-source parasitic capacitance of the active clamp switch S2 is modeled as a capacitor Coss2, and a body diode of the active clamp switch S2 is modeled as BD2. These models 200, 202, 204, 206 will be referenced in describing the operation of the switching power converter circuit 100 below.

FIGS. 2A-D will be described together with FIG. 3, which provides waveforms illustrating the operation of the switching power converter circuit 100 of FIG. 1 in accordance with the primary side models of FIGS. 2A-2D. Five time frames (T1, T2, T3, T4, and T5) are illustrated that collectively make up one switching cycle. The time frames are not necessarily fixed and some of the time frames may vary between cycles.

Figure 2A:
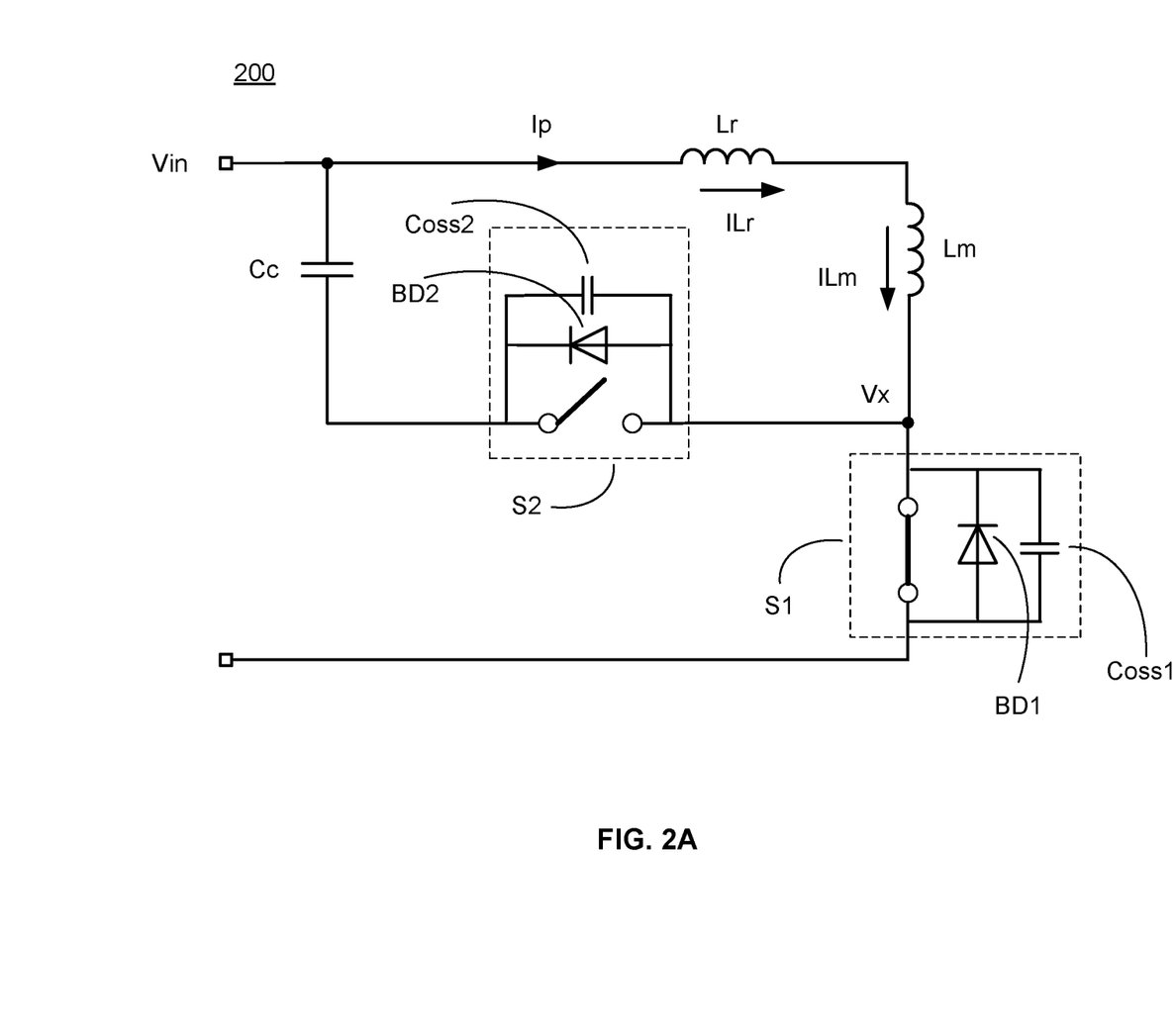
FIG. 2A illustrates a primary side of a switching power converter circuit during a first stage of operation of one switching cycle with leakage inductance, magnetizing inductance, and parasitic capacitance modeled as circuit elements, according to one embodiment.
Figure 2B:
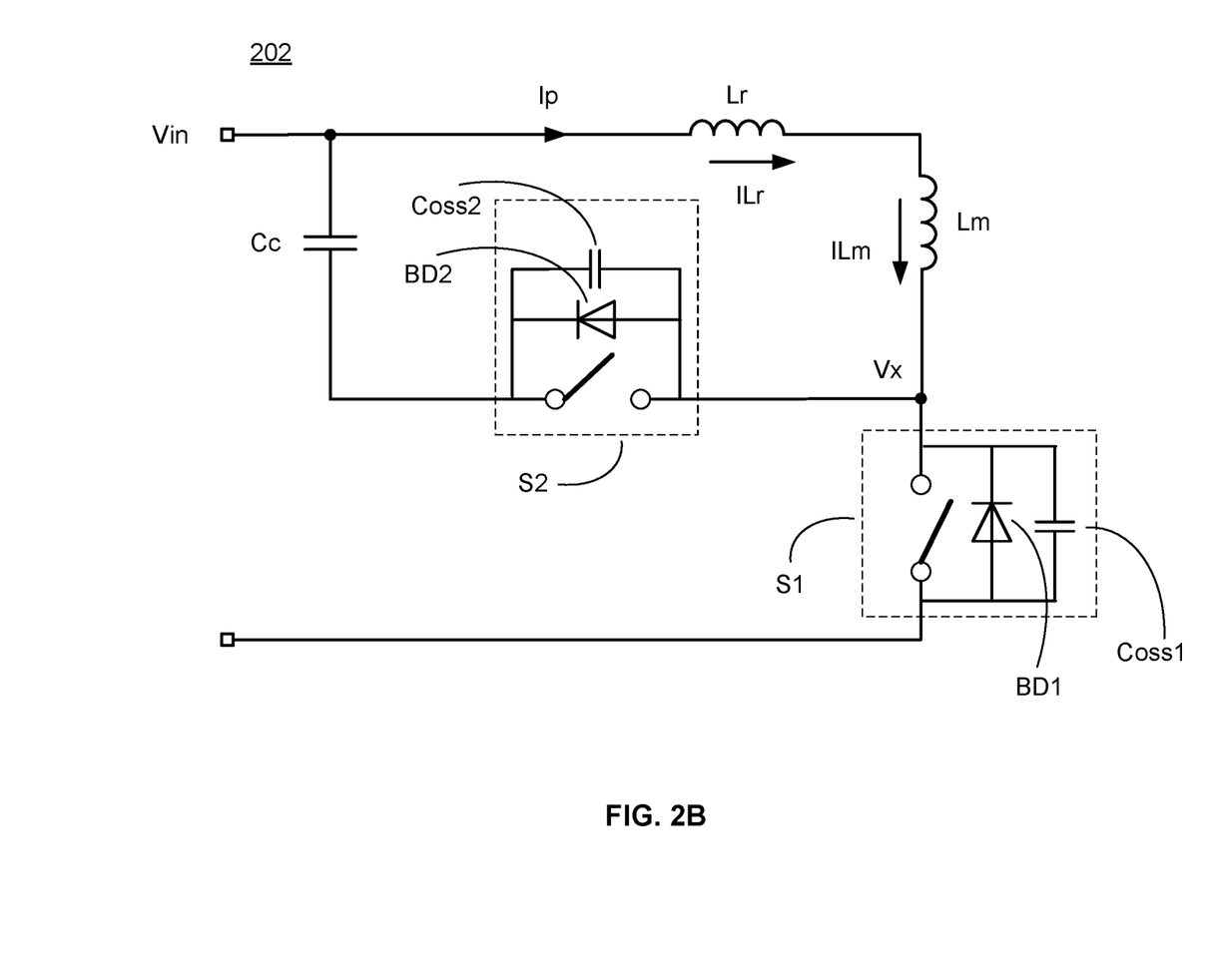
FIG. 2B illustrates the primary side of the switching power converter circuit during a second stage of operation of one switching cycle with leakage inductance, magnetizing inductance, and parasitic capacitance modeled as circuit elements, according to one embodiment.

During time frame T1, Vg1 has a high value (i.e., the power switch S1 is turned on), Vg2 has a low value (i.e., the active clamp switch S2 is turned off), and Vg3 has a low value (i.e., the secondary side switch S3 is turned off). Operation of the switching power converter circuit 100 during time frame T1 is illustrated by the primary side model 200 in FIG. 2A. In this time frame T1, the BD1 of the power switch S1 stops conduction as a result of the voltage Vx across the power switch S1 being substantially zero (coupled to ground). The voltage across the primary winding Np (i.e., the voltage Vp) is the input voltage Vin, which causes energy to be stored in the primary winding Np and the primary winding primary current Ip to increase. The primary current Ip is equal to a leakage inductance current ILr and equal to a magnetizing inductance current ILm (i.e., Ip=ILr=ILm). The leakage inductance current ILr and the magnetizing inductance current ILm increase linearly with a slope dependent on the input voltage Vin as described in the following equation:

$$ip(t) = ip(t_0) + \frac{Vin}{L_m(1+\beta)}(t_1) \quad (1)$$

$$\beta = \frac{L_r}{L_m} \quad (2)$$

where $t_0$ is a starting time of time frame T1 and $t_1$ is an end time of time frame T1. The voltage across the secondary winding Ns (i.e., the voltage Vs) is zero, blocking the transfer of energy to the load. In this state, energy is supplied to the load via the output filter capacitor C1. The auxiliary winding voltage Va is proportional to the secondary winding voltage Vs, and is therefore zero, which means the sensed voltage V_sense is also zero.

During time frame T2, Vg1 has a low value (i.e., the power switch S1 is turned off), Vg2 has a low value (i.e., the active clamp switch S2 is turned off), and Vg3 transitions from a low value to a high value (i.e., the secondary side switch S3 turns on). Operation of the switching power converter circuit 100 during this time frame T2 is illustrated by the primary side model 202 in FIG. 2B. The primary current Ip charges up the capacitor Coss1 of the power switch S1 (approximately linearly). Following the secondary side switch S3 turning on when V_S3 drops below ground, the energy stored in transformer T1 is transferred to the load and the secondary side current Is re-charges the output filter capacitor C1.

Figure 2C:
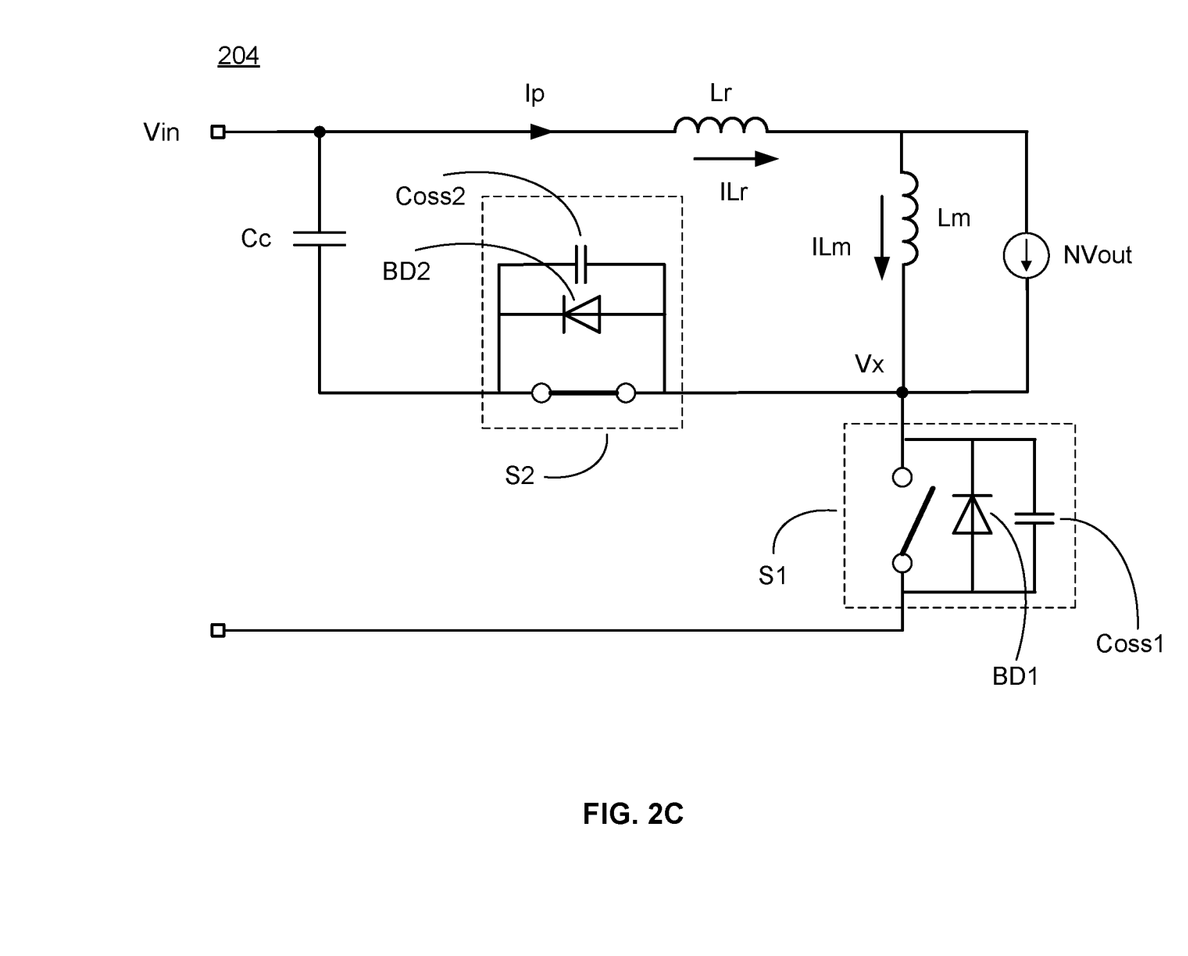
FIG. 2C illustrates the primary side of the switching power converter circuit during a third and fourth stage of operation of one switching cycle with leakage inductance, magnetizing inductance, and parasitic capacitance modeled as circuit elements, according to one embodiment.
Figure 2D:
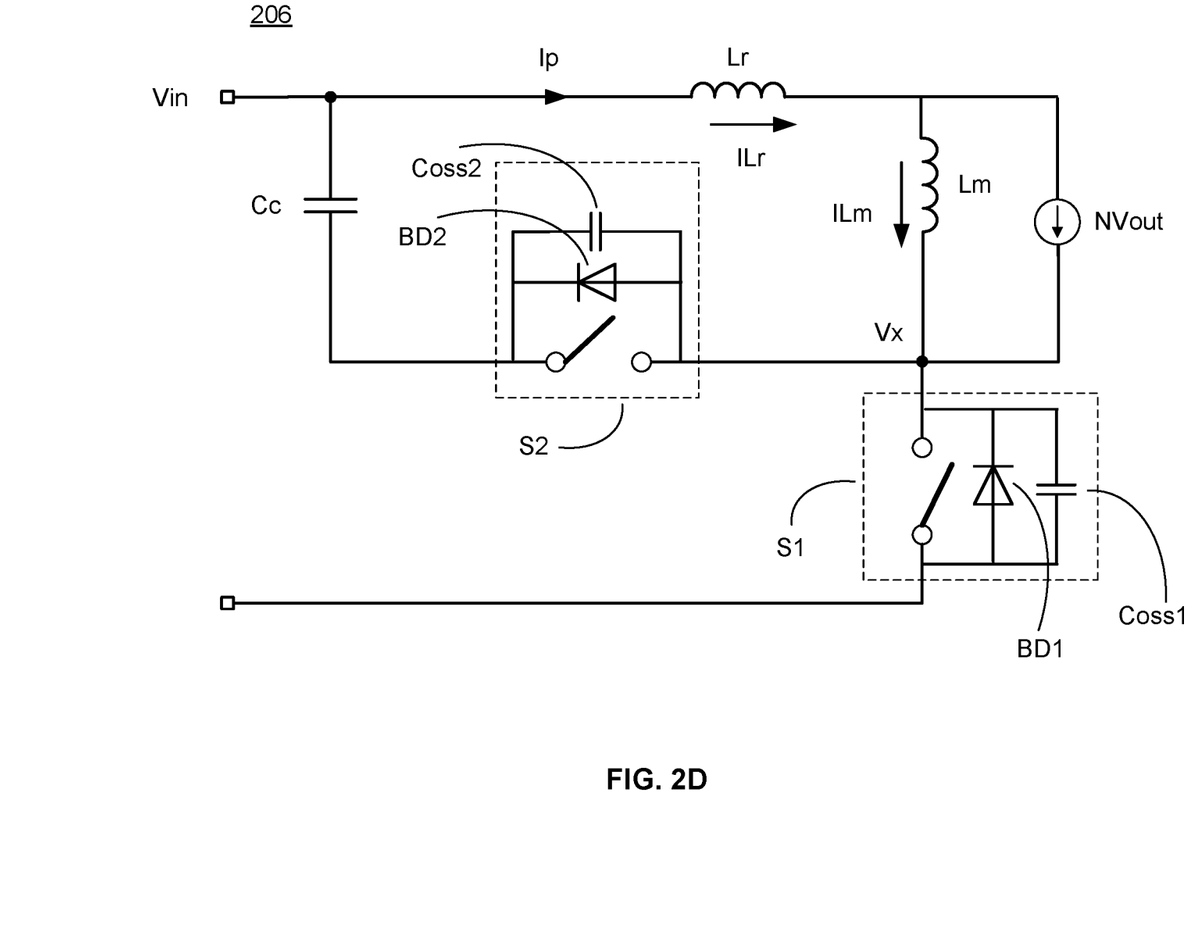
FIG. 2D illustrates the primary side of the switching power converter circuit during a fifth stage of operation of one switching cycle with leakage inductance, magnetizing inductance, and parasitic capacitance modeled as circuit elements, according to one embodiment.

During time frame T3, Vg1 has a low value (i.e., the power switch S1 is turned off), Vg2 has a high value (i.e., the active clamp switch S2 is turned on), and Vg3 has a high value (i.e., the secondary side switch S3 is turned on). Operation of the switching power converter circuit 100 during this time frame T3 is represented by the primary side model 204 in FIG. 2C. At the start of time frame T3, the voltage Vx across the power switch S1 is the sum of the input voltage Vin and a voltage across the clamping capacitor Cc and the body diode BD2 of the active clamp switch S2 starts to conduct. The inductor Lm and the inductor Lr resonate with both the clamping capacitor Cc and the capacitor Coss2 of the active clamp switch S2 until the secondary winding voltage Vs is greater than the output voltage Vout. During the time frame T3, the magnetizing inductance current $I_{Lm}$ at a time t decreases linearly transferring energy to the output as described by the following equation:

$$iLm(t) = iLm(t_2) - \frac{NVout}{Lm}(t - t_2) \quad (3)$$

where $t_2$ is a starting time of time frame T3, t is a time during time frame T3, and NVout is a reflected voltage with N representing a turn ratio (i.e., Np/Ns) between the primary winding Np and the secondary winding Ns. With the inductor Lr and the clamping capacitor Cc resonating during the transformer T1 reset, the leakage inductance current $I_{Lr}$ is described by the following equations:

$$i_{Lr}(t) = A_2 \cdot \sin(\omega_2 t + \varphi_2) \quad (4)$$

$$A_2 = \sqrt{(i_{Lr}(t_3))^2 + \left(\frac{(NVout)\beta}{Z_2}\right)^2} \quad (5)$$

$$Z_2 = \sqrt{\frac{Lr}{Cc + Coss1}} \quad (6)$$

$$\omega_2 = \frac{1}{(Cc + Coss1) \cdot Lr} \quad (7)$$

$$tg(\varphi_2) = \frac{Z_2 \cdot i_{Lr}}{-NVout \cdot \beta} \quad (8)$$

where t is a time during time frame T3, t3 is an end time of time frame T3, tg is a phase shift time for a resonant frequency, and $\varphi_2$ is a phase difference. The primary current Ip is equal to the leakage inductance current $I_{Lr}$. The leakage inductance current $I_{Lr}$ charges the clamping capacitor Cc coupled between the active clamp switch S2 and the primary winding Np.

During time frame T4, Vg1 has a low value (i.e., the power switch S1 is turned off), Vg2 has a high value (i.e., the active clamp switch S2 is turned on), and Vg3 has a low value (i.e., the secondary side switch is turned off). Still referring to the primary side model of FIG. 2C, at t3, the leakage inductance current $I_{Lr}$ and the magnetizing inductance current $I_{Lm}$ have equal and opposite current slope directions. After $t_3$, the voltage across the inductor Lr is affected by only the magnetizing inductance current $I_{Lm}$. This results in a voltage drop of the sensed voltage V_sense and a voltage drop of the secondary winding voltage Vs. The voltage Vx across the power switch S1 remains at a level exceeding the input voltage Vin. Here, the voltage Vx is the sum of the input voltage Vin and a voltage across the clamping capacitor Cc where the voltage across the clamping capacitor Cc substantially equals the voltage NVout across the primary winding. The voltage across the inductor Lm is described by the following equation:

$$V_{Lm} = V_{Cc} \cdot V_{Lr} = Lr \cdot \frac{d}{dt} iLm(t) \qquad (9)$$

where $V_{Cc}$ is the voltage across the clamping capacitor and $V_{Lr}$ is the voltage across the inductor Lr.

During time frame T5, Vg1 has a low value (i.e., the power switch S1 is turned off), Vg2 has a low value (i.e., the active clamp switch S2 is turned off), and Vg3 has a low value (i.e., the secondary side switch is turned off). Operation of the switching power converter circuit 100 during this time frame T5 is represented by the primary side model 206 in FIG. 2D. The leakage inductance current $I_{Lr}$ and the magnetizing inductance current $I_{Lm}$ charge up the capacitor Coss2 of the active clamp switch S2 until the voltage across the capacitor Coss2 is equal to the voltage across the clamping capacitor Cc. As a result, the voltage Vx decreases and equals the input voltage Vin when the voltage across the capacitor Coss2 equals the voltage across the clamping capacitor Cc. The leakage inductance current ILr and the magnetizing inductance current ILm discharge the capacitor Coss1 of the power switch S1. As a result, the voltage Vx continues to decrease to zero. The ZVS condition is achieved when Vx reaches substantially zero.

In an example control scheme, the primary side controller 110 may control when it turns off power switch S1 based on sensed values or a predefined timing scheme. In an embodiment, the primary side controller 110 determines to turn off the power switch S1 based on detecting when the primary current Ip reaches a threshold level. For example, the threshold level may be detected by measuring the voltage across a resistor (not shown) placed in between the source connection of the power switch S1 and ground. When the voltage across this resistor equals the threshold level, the power switch S1 is turned off. In another embodiment, the power switch S1 is turned off after a predetermined amount of time, which may be estimated to correspond to the amount of time for the primary current Ip to reach the threshold level. In another example control scheme, the primary side controller 110 controls when to turn on the power switch S1. For instance, the power switch S1 is turned on after a fixed time period after the active clamp switch S2 turns off. This fixed time period is denoted Tb in FIG. 3. In some embodiments, the time period Tb may be a fixed time period based on output capacitance circuit characteristics of the switching power converter circuit 100.

In another example control scheme, the primary side controller 110 controls the active clamp switch S2 to turn on a short time after the power switch S1 turns off in each switching cycle. For example, the primary side controller 110 may turn the active clamp switch S2 on after the voltage Vx across the power switch S1 ramps up to a level above the input voltage Vin, which may be detected by V_sense exceeding a predefined value based on circuit design characteristics. The primary side controller 110 adjusts the on-time of the active clamp switch S2 to turn off the active clamp switch S2 based on the timing of the voltage drop occurring in the sensed voltage V_sense satisfying the predefined detection condition in a previous switching cycle. To detect the predefined detection condition, the primary side controller 110 senses the sensed voltage V_sense after the active clamp switch S2 turns on (and before the power switch S1 turns back on). The primary side controller 110 may then compare the timing of the detected predefined detection condition relative to a target timing and adjust the timing of turning off the active clamp switch S2 in subsequent switching cycles so that the timing of the detected predefined detection condition occurring and the active clamp switch S2 turning off in the subsequent cycle is closer to the target timing.

Figure 3:
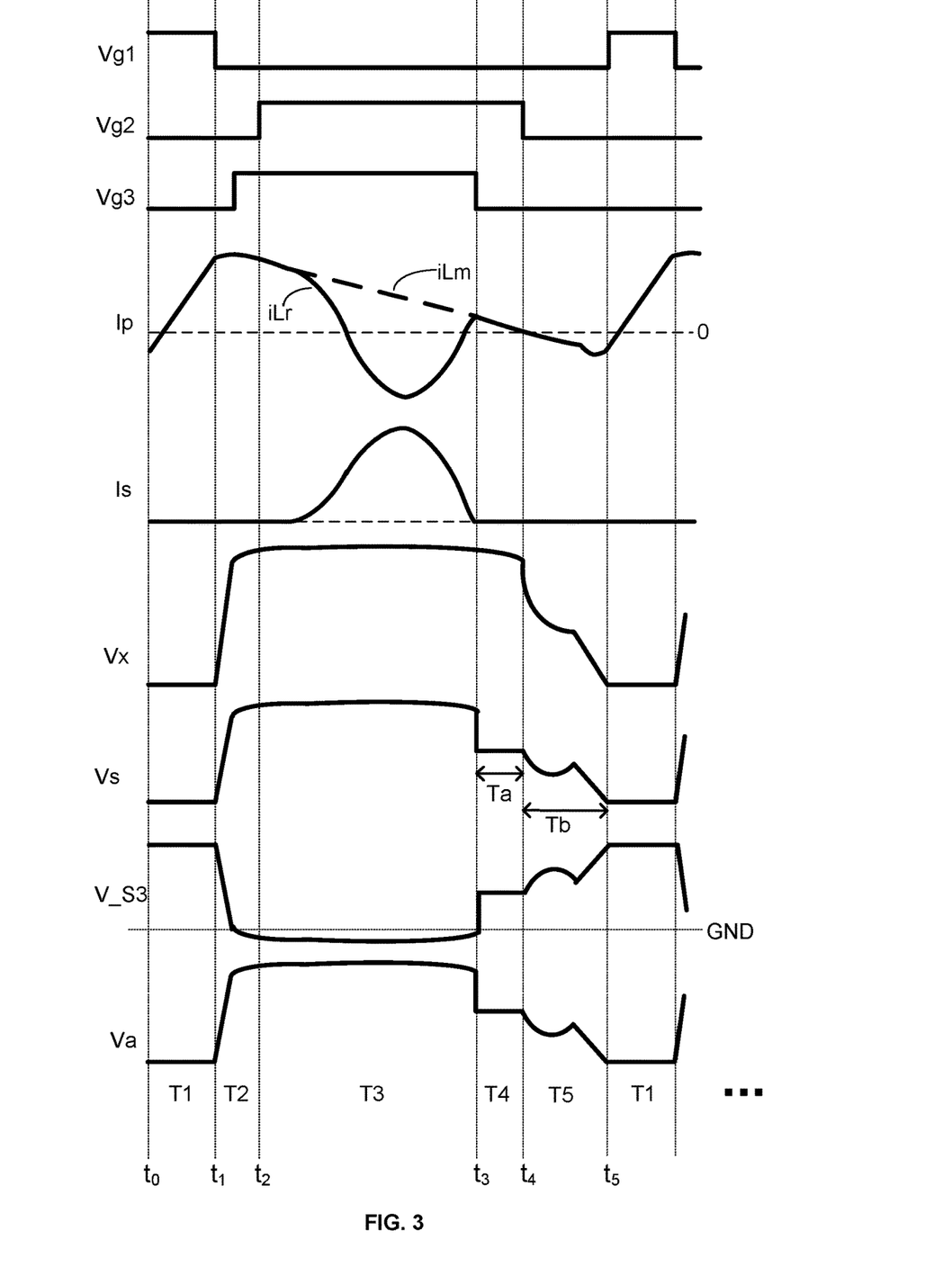
FIG. 3 illustrates waveforms representing operation of a switching power converter circuit, according to one embodiment.

In FIG. 3, time period Ta represents a time between detecting the secondary side switch S3 turning off and the active clamp switch S2 turning off. The substantially fixed time period Ta+Tb represents the time between the sensed voltage V_sense satisfying the predefined detection condition and the ZVS condition taking place. The substantially fixed time period Ta+Tb may be a fixed time period based on circuit characteristics of the switching power converter circuit 100. Under the described control scheme, the primary side controller 110 detects Ta or Tb (or both) in each switching cycle and adjusts the on-time of the active clamp switch S2 in subsequent switching cycles so as to maintain Tb (and correspondingly Ta since Ta+Tb is constant) within a predefined range of a target time period. As a result, the power switch S1 can be controlled to turn on after the ZVS condition is reached, thereby enabling efficient switching.

For example, in one control scheme, if the time Ta between the sensed voltage V_sense satisfying the predefined detection condition and the active clamp switch S2 turning off is above a target time period in a current switching cycle, then the turn-off time of the active clamp switch S2 is adjusted to turn off the active clamp switch S2 earlier in the next switching cycle (thus decreasing the on-time of the active clamp switch S2). If the time Ta between the sensed voltage V_sense satisfying the predefined detection condition and the active clamp switch S2 turning off is below the target time period in the current switching cycle, then the turn-off time of the active clamp switch S2 is adjusted to turn off the active clamp switch S2 later in the next switching cycle (thus increasing the on-time of the active clamp switch S2).

In an alternative control scheme that operates equivalently given the fixed value of Ta+Tb, the primary side controller 110 may adjust switching based on detecting the time Tb between the off-time of the active clamp switch S2 and the on-time of the power switch S1. For example, the primary side controller 110 adjusts the turn-off time of the active clamp switch S2 to occur later in the next switching cycle if the detected time Tb is greater than a target time period, and adjust the turn-off time of the active clamp switch S2 earlier in the next switching cycle if the detected time Tb is less than the target time period. In an efficient switching power converter circuit, the target time period for Tb is a fixed time period between the turn-off time of the active clamp switch S2 and the turn-on time of the power switch S1.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

What is claimed is:

1. A switching power converter circuit comprising:
a transformer coupled between an input terminal receiving an input voltage and an output terminal supplying an output voltage, the transformer including a core, a primary winding around the core coupled to the input terminal, and a secondary winding around the core coupled to the output terminal;
a sensing circuit comprising an auxiliary winding around the core of the transformer, the sensing circuit to generate a sensed voltage based on an auxiliary winding voltage across the auxiliary winding;
a power switch coupled to the primary winding of the transformer, the power switch to control current through the primary winding;
an active clamp switch to control leakage energy of the switching power converter circuit when the power switch is turned off;
a secondary side switch to control secondary side current through the secondary winding;
a secondary side controller to control switching of the secondary side switch; and
a primary side controller to control switching of the power switch to regulate the output voltage and to control switching of the active clamp switch to turn on the active clamp switch following the power switch turning off and to turn off the active clamp switch based on a detected timing of a voltage drop occurring in the sensed voltage satisfying a predefined detection condition, wherein the voltage drop satisfies the predefined detection condition when the sensed voltage decreases by at least a predefined amount over a predefined time interval while the power switch is turned off and the active clamp switch is turned on.

2. The switching power converter circuit of claim 1, wherein the sensing circuit further comprises:
a collector terminal supplying a collector supply voltage; and
a diode to clamp the sensed voltage to a negative collector supply voltage when a change in current through the auxiliary winding exceeds a threshold.

3. The switching power converter circuit of claim 1, wherein the sensing circuit further comprises:
a detection circuit coupled between a sensed voltage node and the primary side controller, wherein the detection circuit generates a detection signal in response to an occurrence of the predefined detection condition.

4. The switching power converter circuit of claim 1, wherein the detected timing is an amount of time between an occurrence of the voltage drop in the sensed voltage satisfying the predefined detection condition and the active clamp switch being turned off.

5. The switching power converter circuit of claim 1, wherein the primary side controller is configured to detect timing of an occurrence of the voltage drop in the sensed voltage satisfying the predefined detection condition in a first switching cycle, and to control, in a subsequent switching cycle, a turn-off time of the active clamp switch relative to its turn-on time such that the detected timing of the voltage drop in the sensed voltage in the subsequent switching cycle satisfies the predefined detection condition closer to a target timing.

6. The switching power converter circuit of claim 5, wherein the primary side controller is configured to turn on the power switch at a substantially fixed time period after the turn-off time of the active clamp switch in each of the first and subsequent switching cycles.

7. The switching power converter circuit of claim 1, wherein a zero voltage switching condition of the power switch takes place at a substantially fixed time period after the voltage drop in the sensed voltage satisfies the predefined detection condition.

8. The switching power converter circuit of claim 1, wherein the active clamp switch while turned on is coupled to conduct current from the primary winding to charge a clamping capacitor coupled between the active clamp switch and the primary winding.

9. A control circuit for a switching power converter, the control circuit comprising:
an auxiliary winding around a core of a transformer, wherein a sensed voltage is based on an auxiliary winding voltage across the auxiliary winding; and
a primary side controller to control switching of a power switch to regulate an output voltage and to control switching of an active clamp switch to turn on the active clamp switch following the power switch turning off and to turn off the active clamp switch based on a detected timing of a voltage drop occurring in the sensed voltage satisfying a predefined detection condition, wherein the voltage drop satisfies the predefined detection condition when the sensed voltage decreases by at least a predefined amount over a predefined time interval while the power switch is turned off and the active clamp switch is turned on, and
wherein the power switch is coupled to a primary winding of the transformer and the active clamp switch controls leakage energy through the primary winding while the power switch is turned off.

10. The control circuit of claim 9, further comprising:
a collector terminal supplying a collector supply voltage; and
a diode to clamp the sensed voltage to a negative collector supply voltage when a change in current through the auxiliary winding exceeds a threshold.

11. The control circuit of claim 9, further comprising:
a detection circuit coupled between a sensed voltage node and the primary side controller, wherein the detection circuit generates a detection signal in response to an occurrence of the predefined detection condition.

12. The control circuit of claim 9, wherein the detected timing is an amount of time between an occurrence of the voltage drop in the sensed voltage satisfying the predefined detection condition and the active clamp switch being turned off.

13. The control circuit of claim 9, wherein the primary side controller is configured to detect timing of an occurrence of the voltage drop in the sensed voltage satisfying the predefined detection condition in a first switching cycle, and to control, in a subsequent switching cycle, a turn-off time of the active clamp switch relative to its turn-on time such that the detected timing of the voltage drop in the sensed voltage in the subsequent switching cycle satisfies the predefined detection condition closer to a target timing.

14. The control circuit of claim 13, wherein the primary side controller is configured to turn on the power switch at a substantially fixed time period after the turn-off time of the active clamp switch in each of the first and subsequent switching cycles.

15. The control circuit of claim 9, wherein a zero voltage switching condition of the power switch takes place at a substantially fixed time period after the voltage drop in the sensed voltage satisfies the predefined detection condition.

16. The control circuit of claim 9, wherein the active clamp switch while turned on is coupled to conduct current from the primary winding to charge a clamping capacitor coupled between the active clamp switch and the primary winding.

17. A method for controlling a switching power converter, the switching power converter including a transformer coupled between an input terminal receiving an input voltage and an output terminal supplying an output voltage, the transformer including a core, a primary winding around the core coupled to the input terminal, and a secondary winding around the core coupled to the output terminal, an auxiliary winding around the core of the transformer, a power switch coupled to control current through the primary winding, an active clamp switch coupled to return leakage energy to the primary winding during an off-time of the power switch, a primary side controller, a secondary side controller, and a detection circuit, the method comprising:
  detecting a sensed voltage by the detection circuit, the sensed voltage based on an auxiliary winding voltage across the auxiliary winding;
  detecting a timing, in a first switching cycle, of a voltage drop in the sensed voltage satisfying a predefined detection condition by detecting an amount of time it takes for the sensed voltage to decrease by at least a predefined amount over a predefined time interval while the power switch is turned off and the active clamp switch is turned on; and
  controlling, in a subsequent switching cycle, a turn-off time of the active clamp switch relative to a turn-on time of the active clamp switch such that the timing of the voltage drop in the sensed voltage satisfying the predefined detection condition in the subsequent switching cycle is closer to a target timing.

* * * * *